No. 828,789. PATENTED AUG. 14, 1906.
C. WAGNER.
TESTING DEVICE.
APPLICATION FILED MAR. 16, 1906.
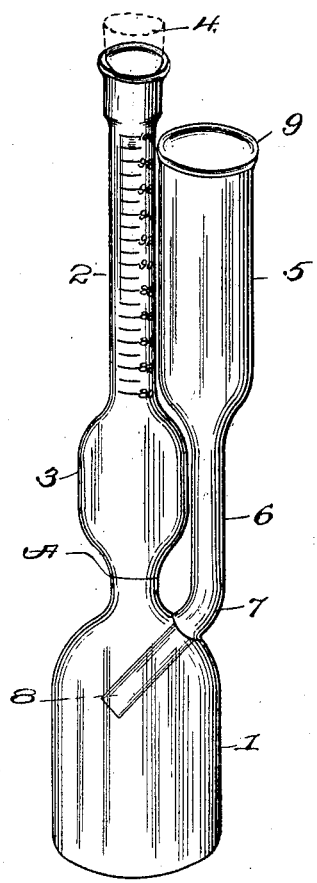
Witnesses
J. M. Fowler Jr.
E. E. Vrooman.
Inventor
Constantin Wagner,
By Mason, Fenwick & Lawrence,
his Attorneys
THE NORRIS PETERS CO., WASHINGTON, D. C.

UNITED STATES PATENT OFFICE.

CONSTANTIN WAGNER, OF NEW YORK, N. Y.

TESTING DEVICE.

No. 828,789.  Specification of Letters Patent.  Patented Aug. 14, 1906.

Application filed March 16, 1906. Serial No. 306,462.

*To all whom it may concern:*

Be it known that I, CONSTANTIN WAGNER, a citizen of the United States, residing at New York, in the county of Westchester and State of New York, have invented certain new and useful Improvements in Testing Devices; and I do hereby declare the following to be a full, clear, and exact description of the invention, such as will enable others skilled in the art to which it appertains to make and use the same.

This invention relates to improvements in testing devices, and has for its object the provision of means for facilitating the testing of dairy products—as, for instance, butter.

With this and other objects in view the invention consists of certain novel constructions, combnations, and arrangements of parts, as will be hereinafter fully described and claimed.

In the drawing the figure is a perspective view of a device constructed in accordance with the present invention.

Referring to the drawing by numerals, 1 designates the body of a bottle, and 2 the graduated neck thereof. Intermediate the ends of the neck 2, and preferably near the lower portion thereof, a bulb 3 is formed. If it is desirable, a stopper may be placed in the neck 2, as is shown by dotted lines 4.

A funnel 5 is positioned contiguous to the body 1 and is integrally connected to the body 1 by means of a long stem 6, which stem is bent intermediate its ends, as at 7. The lower end of the bent portion 8 terminates near the middle of and within the body 1. The long funnel 5 diverges at its upper end 9. The funnel 5 and a portion of the stem 6 not within the body are positioned parallel to the neck 2.

If it is desired to test butter, a standard amount of butter is inserted and weighed in the bottle at the normal temperature. After the exact amount of butter to be tested has been weighed and determined the bottle is warmed, so that the butter will run from the funnel into the bottle. Then a standard amount of acid is mixed with the butter and this composition is rotated in any suitable regulation centrifugal machine. After this hot water is added, so that the bottom of the fat-column will be level with the point marked "A."

Among the advantages of this device one is that by means of the long stem and funnel water may be added to the column of liquid at will, so as to raise the column of fat, giving to the bottle all the advantages of a U-shaped tube. Further, by gently pressing down or gently drawing up the rubber stopper at the top of the graduated neck the fat may be moved in the graduated neck, so as to bring the lower end of the fat-column level with a predetermined mark—as, for instance, "A." When the column of butter-fat is exactly at "A," the result may then be read upon the graduated scale of neck 2. By employing the elongated funnel 5 and neck 6 liquid may be added or taken away from the bottle without disturbing the butter-fat, whereas without this peculiar structure of the device it is impossible to remove any liquid from the bottle without at the same time removing some of the butter-fat.

It will be obvious that the device is formed of transparent material, preferably glass.

What I claim is—

1. As a new article of manufacture, a testing device comprising a bottle, said bottle provided with a body and a long neck, a bulged portion formed in said neck intermediate its ends, an elongated funnel provided with a long stem, the stem integral with the body of said bottle, and said stem bent intermediate its ends, the lower portion of said stem positioned within the body of the bottle and the funnel and a portion of the stem positioned parallel with the neck of the bottle.

2. In a testing device, the combination with a bottle provided with an elongated neck, of a funnel positioned contiguous to said neck, a stem bent intermediate its ends and integral with said funnel, the lower portion of said stem positioned within and at an angle to the longitudinal axis of said body.

3. The combination with a bottle having graduations formed thereon, of a long-stemmed funnel integral with said bottle, and arranged parallel with said bottle, the lower portion of said stem beng positioned within said bottle at an angle to said bottle.

4. The combination with a bottle, of an elongated, long-stemmed funnel integral with said bottle and parallel thereto, said stem bent intermediate its ends, the lower portion of said stem positioned within said bottle, and means positioned in the bottle for regulating the height of liquid contained therein.

In testimony whereof I affix my signature in presence of two witnesses.

CONSTANTIN WAGNER.

Witnesses:
FANNIE GANSBERG,
HUGO MOCK.